US006418756B1

(12) United States Patent
McDermott

(10) Patent No.: US 6,418,756 B1
(45) Date of Patent: Jul. 16, 2002

(54) METHOD OF MAKING PLANAR WAVEGUIDES USING LOW FLOW RATES OF FEEDSTOCK VAPORS FROM A GAS AND LIQUID MIXTURE

(75) Inventor: Mark A. McDermott, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/494,092

(22) Filed: Jan. 28, 2000

(51) Int. Cl.[7] ................................................ C03B 8/04

(52) U.S. Cl. ............................ 65/377; 65/386; 65/395; 65/413

(58) Field of Search .......................... 65/395, 413, 386, 65/530, 377

(56) References Cited

U.S. PATENT DOCUMENTS 4,230,744 A * 10/1980 Blankenship ................ 65/413
5,043,002 A 8/1991 Dobbins et al.
5,141,549 A 8/1992 Tumminelli
5,599,371 A 2/1997 Cain et al.
5,707,415 A 1/1998 Cain

FOREIGN PATENT DOCUMENTS

EP 0 760 373 A 3/1997
JP 52-2744 * 1/1977 .................. 65/413
JP 55-20277 * 2/1980 .................. 65/413
WO WO 97 22553 A 6/1997
WO WO 98 27140 A 6/1998

* cited by examiner

*Primary Examiner*—John Hoffmann
(74) *Attorney, Agent, or Firm*—Philip G. Alden; James V. Suggs

(57) ABSTRACT

The present invention provides a method for producing low flow rates of feedstock vapors used in the manufacture of silica glass. The method includes the steps of providing a constant flow of a liquid feedstock, mixing the flow of the liquid feedstock with an injector gas, expelling the mixture of liquid feedstock and inert gas from an injector orifice into a vaporizer chamber, flowing a carrier gas into the vaporizer chamber and through the mixture of liquid feedstock and injector gas, and vaporizing the liquid feedstock in the vaporizer chamber. The present invention is useful in the fabrication of planar silica waveguides.

18 Claims, 4 Drawing Sheets

22 40 46 44 28 24 34 42 56 48 30 26 50 45 58 58 36 52 32 54

34
25
61
23
30
63
36

METHOD OF MAKING PLANAR WAVEGUIDES USING LOW FLOW RATES OF FEEDSTOCK VAPORS FROM A GAS AND LIQUID MIXTURE

FIELD OF THE INVENTION

The present invention relates to the field of producing low flow rates of feedstock vapors utilized in the manufacturing of silica glass. In particular, the invention is especially suited for use in the manufacture of planar optical waveguides and lightwave optical circuits.

BACKGROUND OF THE INVENTION

Silica soot is deposited in thin layers on planar surfaces in the manufacture of lightwave optical circuits. The deposited soot is sintered and consolidated into silica glass that form the core and cladding glasses that make up the optical waveguides in optical circuits. U.S. patent application Ser. No. 08/581,186 filed Dec. 12, 1995, Bandwidth-Adjusted Wavelength Demultiplexer, by Denis M. Trouchet, the disclosure of which is hereby incorporated by reference discloses such a planar optical circuit which functions as a wavelength demultiplexer.

Previous feedstock vapor producing systems used in the manufacture of planar optical waveguides and circuits have used a complicated system of multiple bubblers with an individual bubbler for each of the chemical components of the feedstock vapor. Prior art feedstock vapor producing systems have been complicated and unreliable in producing a low volume flow rate of feedstock vapors. Prior art feedstock vapor producing systems have been found to produce an undesirable pulse in the stream of soot emerging from the flame of the conversion site burner and have difficulties in delivering a consistent low flow rate of feedstock vapors.

In light of the foregoing, there is d need for a method and apparatus for producing low flow rates of feedstock vapors which overcomes the difficulties and shortcomings of the prior art.

SUMMARY OF THE INVENTION

Accordingly, the present invention is directed to a system for producing a low flow rate of feedstock vapors utilized in the manufacturing of optical waveguides such as planar optical circuits that substantially obviates one or more of the problems due to limitations and disadvantages of the related art.

The features and advantages of the invention are set forth in the description which follows and in part will be apparent from the description or may be learned by practice of the invention. The objectives and other advantages of the invention will be realized and attained by the methods and apparatus particularly pointed out in the written description and claims hereof as well as the appended drawings.

To achieve these and other advantages and in accordance with the purpose of the invention as embodied and broadly described, the invention includes a method of producing feedstock vapors in the manufacturing of optical waveguides using the steps of providing a constant flow of a liquid feedstock, mixing the flow of liquid feedstock with an inert injector gas, providing a vaporizer chamber, expelling the mixture of liquid feedstock and injector gas from an injector orifice, and into the vaporizer chamber, flowing a carrier gas into the vaporizer chamber and by the injector orifice and through the expelled mixture of liquid feedstock and injector gas. The inventive method includes the further steps of vaporizing the liquid feedstock into a feedstock vapor and delivering the feedstock vapor to a conversion site where it is converted into a silica soot which produces a silica based glass.

In another aspect the invention includes an apparatus for generating and delivering feedstock vapors in the manufacturing of silica glass which includes a means for providing a constant flow of a liquid feedstock, a means for providing a flow of an injector gas, and a mixer for mixing the liquid feedstock with the injector gas. The apparatus further includes a longitudinal injector tube for communicating the mixture of liquid feedstock and injector gas from the mixer and into a vaporizer chamber and a means for flowing a carrier gas close to the injector tube, preferably said flow starting before entry into the vaporizer chamber, and into the vaporizer chamber wherein the injected liquid feedstock is vaporized into a feedstock vapor. The apparatus includes a delivery conduit for delivering the feedstock vapor to a silica glass manufacturing site wherein the feedstock vapor is converted into silica soot.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention together with the description serve to explain the principles of the invention.

DETAILED DESCRIPTION OF THE INVENTION

Figure 1:
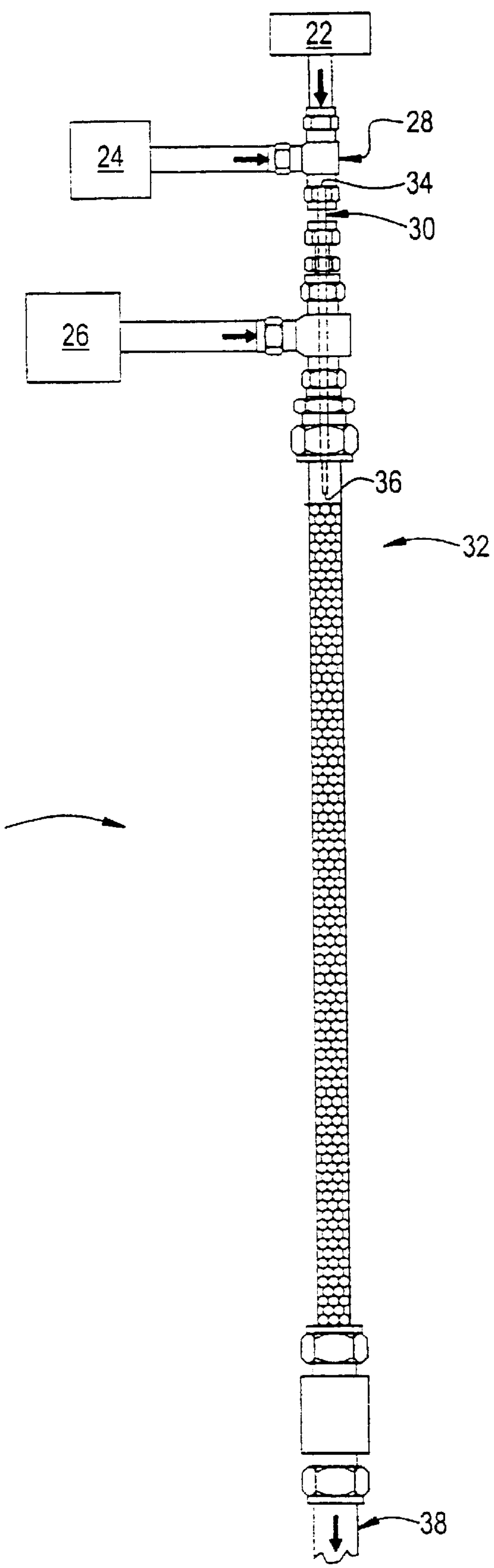
FIG. 1 discloses a vaporizer system in accordance with the invention.

The inventive method of making an optical waveguide, particularly a planar optical waveguide, includes an inventive method of providing feedstock vapors which are converted into a silica based glass which forms the optical waveguide. The method includes the step of providing a constant fluid flow of a liquid feedstock at a volume flow rate less than approximately 0.5 ml/minute. The method includes the step of mixing the provided constant flow of liquid feedstock with an injector gas, preferably an inert injector gas such as $N_2$. The method includes the step of providing a vaporizer chamber. The method includes the step of expelling the mixture of liquid feedstock and injector gas from an injector orifice into the vaporizer chamber. Preferably the injector orifice has an inside diameter less than 1.4 mm, more preferably in the range from about 0.15 mm to about 0.9 mm, more preferably in the range from about 0.4 mm to about 0.8 mm, more preferably in the range from about 0.7 mm to about 0.8 mm, more preferably in the range from about 0.73 mm to about 0.79 mm, more preferably in the range from about 0.75 mm to about 0.77 mm, and most preferably about 0.03 inch. The method further includes the step of flowing a carrier gas, preferably an inert carrier gas, such as $N_2$, into said vaporizer chamber proximate said injector orifice, and through the mixture of liquid feedstock and injector gas expelled from the injector orifice. The method further includes the step of vaporizing the liquid feedstock into a feedstock vapor within the vaporizer chamber. The method includes the step of removing the feedstock vapor from the vaporizer chamber and delivering the feedstock vapor to a conversion site. The method includes the step of converting the feedstock vapor delivered to the conversion site into a silica based glass used to form the optical waveguide and planar optical circuit. The preferred conversion site is comprised of a elongated burner which produces a flame which converts the vapor feedstock into a soot. The preferred method of converting the vapor feedstock includes flame hydrolyzing the vapor feedstock in a burner flame which converts the vapor feedstock into a silica soot which is deposited onto a preferably planar deposition surface and then sintered into a silica based glass layer. Preferably a mixture of fuel gas is added to the feedstock vapor prior to delivering to the conversion site burner and flame.

The step of providing a constant flow of a liquid feedstock at a volume flow rate less than about 0.5 ml/minute includes preferably providing a constant flow of the liquid feedstock at a volume flow rate less than 0.1 ml/minute, preferably in the range of 0.01 to 0.09 ml/minute, more preferably in the range of 0.03 to 0.06 ml/minutes and most preferably in the range of 0.045 to 0.055 ml/minute.

The step of mixing and providing the constant flow of liquid feedstock with an injector gas includes the step of mixing the liquid feedstock with the injector gas being provided at a gas volume flow rate in the range from 0.01 to 0.15 standard liters per minute and more preferably in the range from 0.02 to 0.1 standard liters per minute. Preferably the flow of injector gas is traverse to the flow of liquid feedstock to provide beneficial mixing between the liquid feedstock and the injector gas prior to entry into the injector tube and the vaporizer chamber. Preferably the flow of injector gas is approximately perpendicular to the flow of liquid feedstock during mixing.

The step of expelling the mixture of liquid feedstock and injector gas from an injector orifice and into the vaporizer chamber includes expelling the mixture from an injector orifice having an inside diameter less than 0.9 mm, and preferably greater than 0.15 mm. Preferably the inside diameter of the injector orifice is in the range from about 0.4 mm to 0.8 mm, more preferably in the range from about 0.73 mm to 0.79 mm, more preferably in the range from about 0.75 mm to about 0.77 mm, and most preferably is about 0.03 inch (0.762 mm).

The steps of mixing and expelling the mixture of liquid feedstock and injector gas include the step of forcing the liquid feedstock and injector gas through a longitudinal injector tube extending into the vaporizer chamber with the longitudinal injector tube terminating with an injector orifice. Preferably the longitudinal injector tube has an entrance, at its distal end from the injector orifice, with the entrance having an inside diameter greater than the inside diameter of the injector orifice. Preferably the longitudinal tube has a decreasing inside diameter between the entrance and the injector orifice.

The step of providing a constant flow of a liquid feedstock includes the step of pumping the liquid feedstock with a single stroke nonreciprocating pump. Preferably the method includes the step of providing a liquid feedstock by mixing a liquid siloxane with at least one dopant precursor liquid to form the liquid feedstock utilized in the invention.

The step of flowing a carrier gas into the vaporizer chamber, by said injector orifice, and through the expelled mixture includes the step of flowing an inert carrier gas, preferably along the longitudinal length of the longitudinal injector tube, preferably starting the flow along the length prior to entry into the vaporizer chamber, at a gas volume flow rate in the range from 0.1 to 0.3 standard liters per minute, most preferably in the range from 0.15 and 0.2 standard liters per minute. Preferably the flowing of a carrier gas coaxially along the length of the longitudinal injector tube includes flowing the carrier gas along a segment of the injector tube that is outside of the vaporizer chamber.

Preferably the step of providing a liquid feedstock includes the step of mixing at least two liquid compounds and preferably the step of vaporizing the liquid feedstock into a feedstock vapor includes the step of heating the vaporizer chamber to a temperature at least as high as the boiling points of the liquid compounds.

Preferably the step of providing a vaporizer chamber includes providing a vaporizer chamber comprised of a longitudinal length of ducting having an inside diameter in the range of 8 mm to 20 mm, more preferably with the vaporizer chamber containing solid inert members, such as glass beads, with a diameter in the range from 3 mm to 5 mm. More preferably the flow of the carrier gas is along an axis which is coaxial and common with the longitudinal axis of the vaporizer chamber ducting, and the injector tube.

The inventive apparatus for generating and delivering feedstock vapors in the manufacturing of silica glass which is formed into planar optical waveguides in a planar optical circuit, such as a wavelength multiplexer/demultiplexer, includes a means for providing a constant flow of a liquid feedstock and a means for providing a flow of an injector gas. The apparatus includes a mixer wherein the flow of liquid feedstock is mixed with the flow of injector gas to form a mixture of liquid feedstock and injector gas. The apparatus includes a longitudinal injector tube for communicating said mixture of liquid feedstock and injector gas away from the mixer and into a vaporizer chamber. The apparatus includes a means for flowing a carrier gas proximate said injector tube and into said vaporizer chamber. The mixture of liquid feedstock and injector gas is injected from the injector tube and into the vaporizer chamber where it is vaporized into a feedstock vapor. The apparatus further includes a means for delivering the feedstock vapor to a silica glass manufacturing site wherein the feedstock vapor is converted into silica, preferably silica soot and glass which form planar optical waveguides in a planar optical circuit. Preferably the means for delivering the feedstock vapor to a silica glass manufacturing site includes a means for delivering the feedstock vapor to a conversion site burner wherein said feedstock vapors enter a conversion site flame which converts the feedstock vapor into silica soot which is deposited on a deposition surface.

The means for providing a constant flow of the liquid feedstock in the apparatus preferably includes a nonreciprocating pump.

Preferably in the apparatus the mixer comprises a conduit junction wherein the flow of liquid feedstock is substantially traverse to the flow of injector gas, more preferably wherein said flow of liquid feedstock is vertically oriented and substantially perpendicular to said flow of injector gas.

The longitudinal injector tube of the apparatus includes an entrance proximate said mixer and a distal injector orifice that is proximate the vaporizer chamber wherein the injector orifice preferably has an inside diameter in the range from about 0.15 mm to about 0.9 mm, more preferably about 0.4 mm to about 0.8 mm, more preferably about 0.73 mm to about 0.79 mm, more preferably about 0.75 mm to about 0.77 mm, and most preferably about 0.03 inch.

In the apparatus, the means for flowing a carrier gas proximate said injector tube and into the vaporizer chamber includes a longitudinal carrier gas conduit with said longitudinal injector tube extending through said carrier gas conduit wherein said carrier gas flows along a length of the injector tube, proximate the injector orifice, and through the mixture of liquid feedstock and injector gas that is injected through said injector orifice and into the vaporizer chamber.

Preferably the vaporizer chamber includes a longitudinal length of ducting having an inside diameter in the range of 8 mm to 20 mm. Most preferably the longitudinal injector tube, the carrier gas conduit, and the vaporizer chamber ducting is substantially coaxial and colinear. Preferably the means for removing the feedstock vapors from the vaporizer chamber includes a vapor feedstock delivery conduit proximate the vaporizer chamber which is coaxial and colinear with the vaporizer chamber ducting.

FIG. 1 discloses an apparatus and method of the invention. Feedstock vaporizer system 20 was used to vaporize a liquid feedstock into a feedstock vapor which was converted in a combustion flame into silica soot which was deposited onto a deposition surface and converted into a silica glass which formed an optical waveguide in a planar optical circuit. Means for providing a constant flow of a liquid feedstock 22 provides a constant flow of a liquid feedstock, preferably at a volume flow rate less than about 0.5 ml/minute to mixer 28. Means for providing a flow of an injector gas 24 provides a flow of injector gas to mixer 28 wherein the liquid feedstock is mixed with the injector gas. Longitudinal injector tube 30 communicates the liquid feedstock mixed with injector gas from injector tube entrance 34 to injector orifice 36. The liquid feedstock mixed with injector gas is expelled from injector orifice 36 into vaporizer chamber 32 wherein the liquid feedstock expelled from the injector tube 30 is vaporized into a feedstock vapor. Means for flowing a carrier gas 26 proximate injector tube 30 and into vaporizer chamber 32 provides a flow of carrier gas by injector orifice 36. Vapor feedstock delivery conduit 38 provides a means for delivering the feedstock vapor to a convers on site. Preferably feedstock vaporizer system 20 is vertically oriented as shown in FIG. 1.

Figure 2:
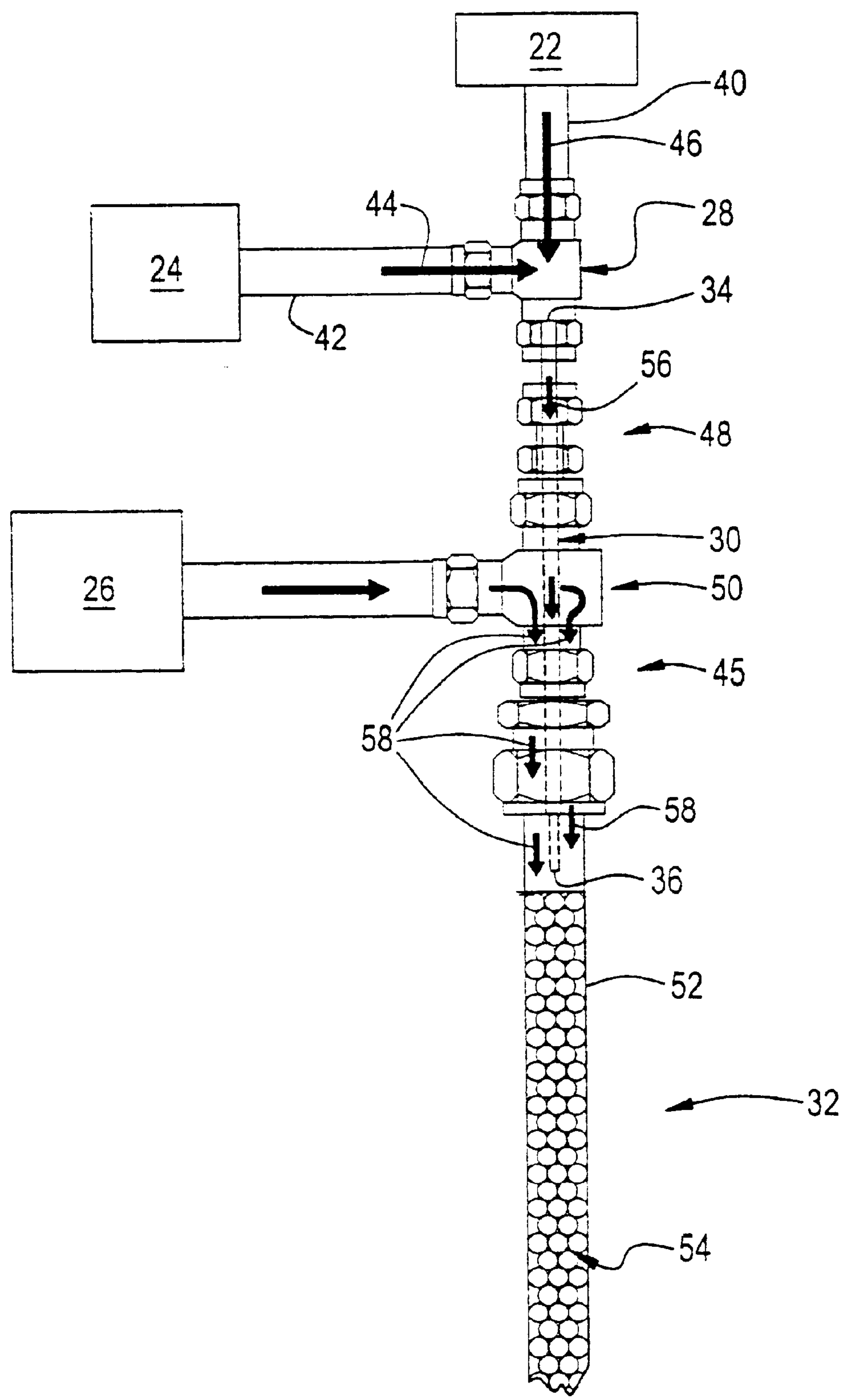
FIG. 2 is an enlarged view of part of FIG. 1 and discloses the vaporizer system and fluid flows therein in accordance with the invention.

FIG. 2 is an enlarged view of the upper portion of vaporizer system 20 as shown in FIG. 1. The solid arrows in FIG. 1 and FIG. 2 depict the flow of fluids in vaporizer system 20.

EXAMPLE

Longitudinal injector tube 30, having a longitudinal length of about 114.3 mm (4.5 inch), was made by inserting a 1.5875 mm (1/16 inch) outside diameter tube about 1.6 mm (1/16 inch) into a longitudinal length of 3.175 mm (1/8 inch) outside diameter tube and secured therein with silver solder. The end segment of the 1.5875 mm outside diameter tube was cut off so that only about 1.5 mm to 3.2 mm of the tube extends out from the 3.175 mm outside diameter tube. A length of a hypodermic tube was inserted about 1.6 mm into the 1.5875 mm outside diameter tube and secured therein with silver solder. The end segment of the hypodermic tube was cut off and deburred so that only about 1.5 mm to 3.2 mm of the hypodermic tube extends out from the 1.5875 mm outside diameter tube. The hypodermic tube may have an inside diameter of 0.254 mm (0.010 inch), 0.3556 mm (0.014 inch), 0.4318 mm (0.017 inch), and 0.762 mm (0.030 inch). The hypodermic tube that is preferred and used has an inside diameter of 0.762 mm (0.030 inch). The end of the hypodermic tube provides the injector orifice 36 having an inside diameter equal to the inside diameter of the hypodermic tube.

Figure 4:
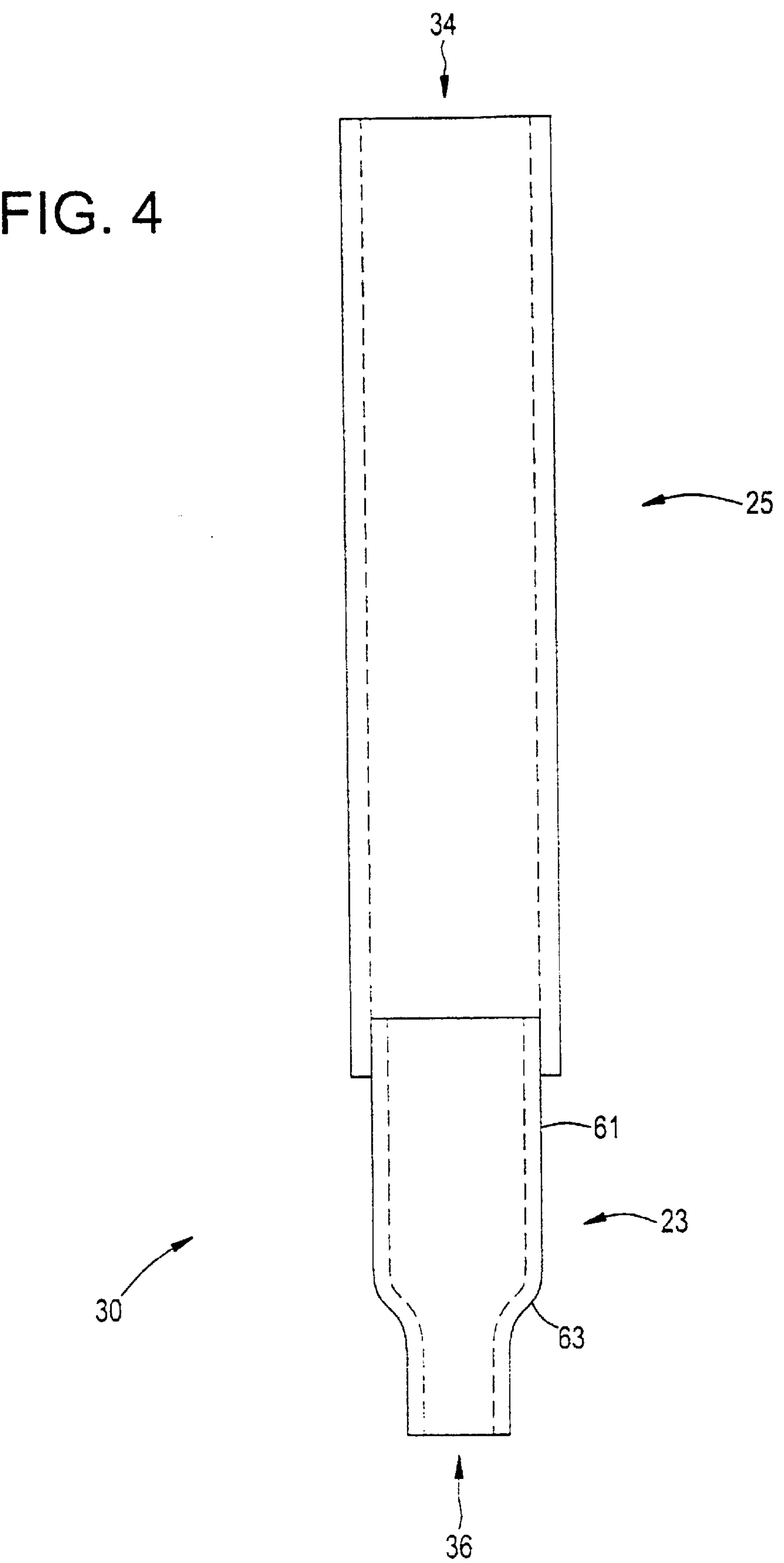
FIG. 4 discloses an injector tube in accordance with the invention.

The preferred longitudinal injector tube 30 of the invention is shown in FIG. 4. Longitudinal injector tube 30 shown in FIG. 4 was made by inserting injector tip 23, which was fabricated by press forming and swagging down a 1.6 mm (0.065 inch) outside diameter stainless steel tube 61 to have a narrowing portion 63 which terminated with injector orifice 36 having a inside diameter of about .76 mm (0.030 inch), into a 3.175 mm (1/8 inch) inside diameter stainless steel tube 25 and silver soldered therein.

As shown in FIG. 2, liquid feedstock and injector gas mixer 28 was comprised of a T-junction of appropriate size to match up with the delivery tubing 40 of liquid feedstock delivery means 22 and the delivery tubing 42 of injector gas delivery means 24. Mixer 28 provided a junction wherein liquid feedstock flow 46 was traverse and substantially perpendicular to injector gas flow 44 to produce a mixture of liquid feedstock and injector gas which enters injector tube 30 through entrance 34. The elongated longitudinal length of injector tube 30 provides additional space where the liquid feedstock may mix with the injector gas.

Injector tube 30, having a length of about 114.3 mm, extended through the interior of outer pipe members 48, through carrier gas T-junction 50 and through carrier gas conduit 45 which had a combined length of about half the length of injector Lube 30, and communicated the mixture of injector gas and liquid feedstock through injector orifice 36 and into vaporizer chamber 32.

Vaporizer chamber 32 was formed from a longitudinal length of ducting 52 made from stainless steel tube having a 12.7 mm (½ inch) inside diameter and a longitudinal length of about 381 mm (15 inch) (about 3 to 4 times the length of injector tube 30). Glass beads 54 having a 4 mm diameter were packed into the interior of ducting 52.

Figure 3:
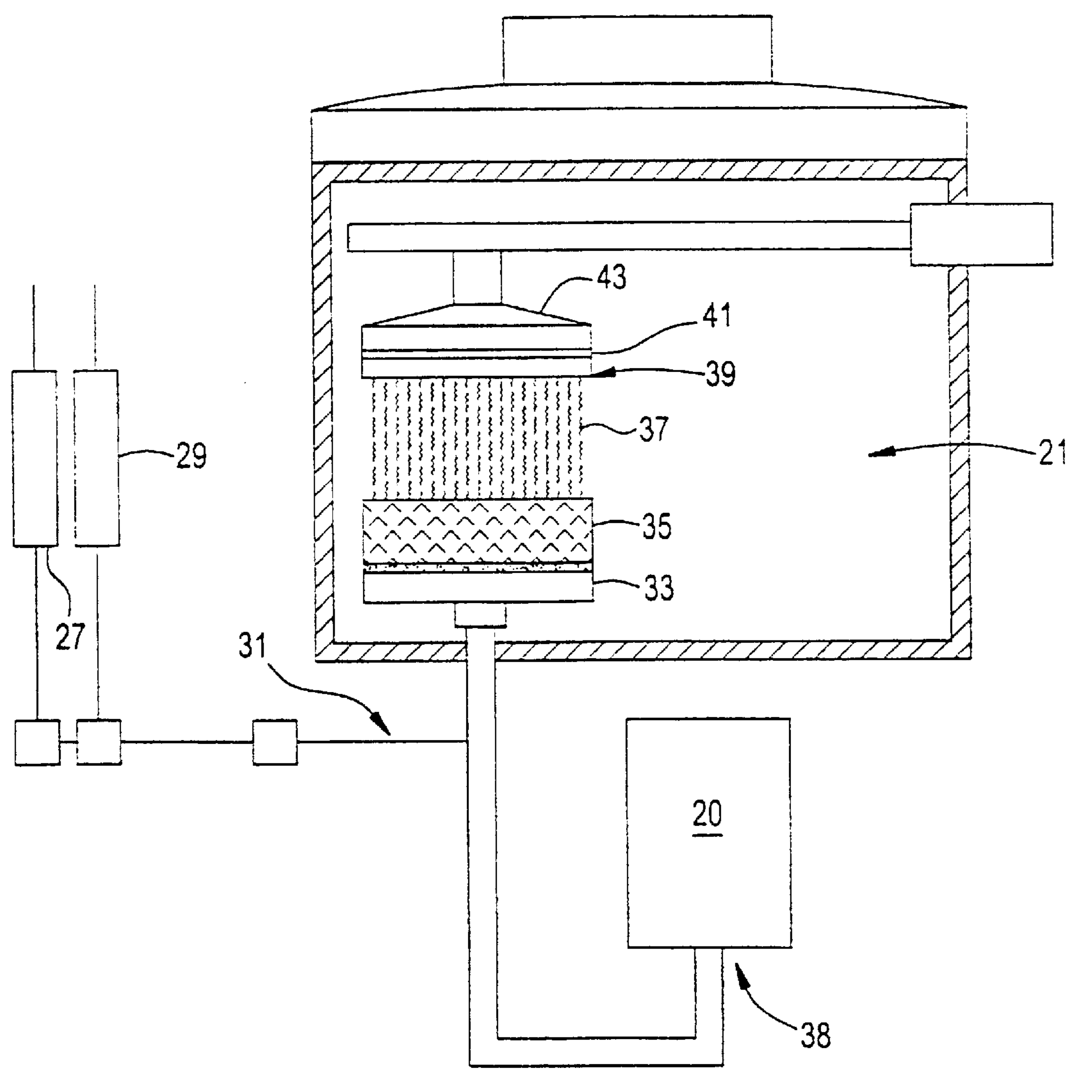
FIG. 3 is a schematic view of vaporizer system and the manufacture of optical waveguides and planar optical circuits.

Feedstock vaporizer system 20 generated and delivered feedstock vapors for the manufacturing of silica soot glass layers as shown in FIG. 3. Feedstock vapors were delivered through feedstock vapor delivery conduit 38 to conversion site 21.

A mixture of fuel gas which includes oxygen 27 and methane 29 was added through fuel gas mixture supply line 31 to the feedstock vapors in delivery conduit 38 being delivered to conversion site 21. The mixture of fuel gas and feedstock vapors were delivered to conversion site burner 33. The feedstock vapors were converted into silica soot 37 in conversion site flame 35. Silica soot 37 from the stream of silica soot emerging from flame 35 was deposited on deposition surface 39 of planar substrate 41 held by substrate holder 43. The silica soot deposited on deposition surface 39 was sintered and consolidated to form a silica glass layer.

A liquid feedstock was provided by mixing appropriate amounts of a high purity siloxane liquid comprised of at least 98% by weight of octamethylcyclotetrasiloxane, as the silica feedstock source, with liquid dopant feedstock sources (dopant precursor) of trimethylphosphate, triethyllborate, and germanium ethoxide to result in a silica glass composition in the $GeO_2$—$B_2O_3$—$P_2O_5$—$SiO_2$ system useful as a core glass in a planar waveguide. Likewise a mixture without germanium ethoxide can provide a silica glass composition in the $B_2O_5$—$P_2O_5$—$SiO_2$ system useful as a cladding glass in a planar waveguide.

The liquid feedstock mixture of octamethylcyclotetrasiloxane with dopant precursor compounds was used to fill a syringe cylinder of a controllable flow screw driven 74900 Series brand syringe pump commercially available from Cole Palmer Inc. This nonreciprocating single stroke syringe pump filled with the liquid feedstock mixture was the providing means 22 for providing a constant flow of a liquid feedstock. This providing means 22 was able to provide a constant flow of the liquid feedstock at a volume flow rate less than about 0.5 ml/minute. The preferred flow rate of liquid feedstock flow 46 was about 0.05 ml/minute which provided the system with good performance.

Means 24 for providing a flow of an injector gas included a $N_2$ inert nitrogen gas source which provided an inert $N_2$ injector gas flow 44 at a volume flow rate in the preferred range of 0.025 to 0.1 standard liters per minute. This $N_2$ injector flow mixed with the flow of liquid feedstock to provide liquid feedstock and $N_2$ injector gas mixture flow 56 which communicated down through longitudinal injector tube 30 and was expelled through injector orifice 36 and into vaporizer chamber 32.

Means 24 for flowing a carrier gas proximate said injector tube 30 and into vaporizer chamber 32 included a $N_2$ inert nitrogen gas source which provided an inert $N_2$ carrier gas flow 58 at a volume flow rate in the preferred range of 0.15 to 0.2 standard liters per minute. Carrier gas flow 58 flowed along injector tube 30, by injector orifice 36, and through the liquid feedstock injector gas mixture that was expelled through orifice 36. The liquid feedstock expelled from orifice 36 was vaporized within vaporizer chamber 32 into a feedstock vapor.

Vaporizer chamber 32 was heated to about 230° C. which was above the 218° C. boiling point of highest boiling point compound of the liquid feedstock. Heat tape was used to heat vaporizer chamber 32 and vapor feedstock delivery conduit 38 which provided a means to deliver the feedstock vapor to a silica glass manufacturing site where the feedstock vapor was converted in a flame into silica soot.

Feedstock vaporizer system 20 generated and delivered a consistent and steady flow of feedstock vapors to a conversion site combustion burner flame which converted the feedstock vapors into silica soot which was deposited on the deposition surface of a silica substrate. The silica soot was sintered into a doped silica glass which formed planar optical waveguides in a planar optical circuit. It was surprising and unexpected that feedstock vaporizer system 20 could generate and deliver such consistent ultra-low volume flow rates of feedstock vapors to a conversion site burner flame where the feedstock vapors were converted into a steady consistent pulse free stream of silica soot which was deposited on the deposition surface of a substrate. Feedstock vaporizer system 20 utilized very low volume flow rates of liquid feedstock without the formation of pulses at the conversion site flame.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of providing feedstock vapors for making a planar optical waveguide, comprising:

providing a constant flow of a liquid feedstock at a volume flow rate less than about 0.5 ml/minute;

mixing said provided constant flow of liquid feedstock with an injector gas;

providing a vaporizer chamber;

expelling said mixture of liquid feedstock and injector gas from an injector orifice and into said vaporizer chamber;

flowing an carrier gas into said vaporizer chamber by said injector orifice, and through said mixture of liquid feedstock and injector gas expelled from said injector orifice;

vaporizing said liquid feedstock into a feedstock vapor within said vaporizer chamber;

removing said feedstock vapor from said vaporizer chamber;

delivering said feedstock vapor to a conversion site; and converting said vapor feedstock into a silica based glass to make a planar optical waveguide.

2. A method as claimed in claim 1 wherein providing a constant flow of a liquid feedstock further comprises providing a constant flow of said liquid feedstock at a volume flow rate less than 0.1 ml/minute.

3. A method as claimed in claim 1 wherein providing a constant flow of a liquid feedstock further comprises providing a constant flow of said liquid feedstock at a volume flow rate in the range of 0.01 to 0.09 ml/minute.

4. A method as claimed in claim 1 wherein providing a constant flow of a liquid feedstock further comprises providing a constant flow of said liquid feedstock at a volume flow rate in the range of 0.03 to 0.06 ml/minute.

5. A method as claimed in claim 1 wherein providing a constant flow of a liquid feedstock further comprises providing a constant flow of said lipid feedstock at a volume flow rate of about 0.045 to 0.055 ml/minute.

6. A method as claimed in claim 1 wherein mixing said provided constant flow of liquid feedstock with an injector gas further comprises mixing said liquid feedstock with an inert injector gas provided at a volume flow rate in the range from 0.01 to 0.15 standard liters per minute.

7. A method as claimed in claim 1 wherein mixing said provided constant flow of liquid feedstock with an injector gas further comprises mixing said liquid feedstock with an inert injector gas provided at a volume flow rate in the range from 0.02 to 0.1 standard liters per minute.

8. A method as claimed in claim 1 wherein expelling said mixture of liquid feedstock and injector gas from an injector orifice and into the vaporizer chamber further comprises expelling said mixture of liquid feedstock and injector gas from an injector orifice having an inside diameter in the range from about 0.15 mm to about 0.9 mm.

9. A method as claimed in claim 8 wherein said injector orifice inside diameter is in the range from about 0.4 mm to about 0.8 mm.

10. A method as claimed in claim 8 wherein said injector orifice has an inside diameter in the range from about 0.73 mm to about 0.79 mm.

11. A method as claimed in claim 8 wherein said injector orifice has an inside diameter in the range from about 0.75 mm to about 0.77 mm.

12. A method as claimed in claim 1 wherein the steps of mixing and expelling further comprises the step of forcing said liquid feedstock and injector gas through a longitudinal injector tube extending into said vaporizer chamber and terminating with said injector orifice.

13. A method as claimed in claim 12 wherein the step of forcing said liquid feedstock and injector gas through a longitudinal injector tube extending into said vaporizer chamber further comprises forcing said liquid feedstock through a longitudinal injector tube having an entrance with an inside diameter greater than the inside diameter of said injector orifice.

14. A method as claimed in claim 12 wherein said step of flowing a carrier gas further comprises flowing an inert carrier gas at a volume flow rate in the range from 0.1 to 0.3 standard liters per minute coaxially along a length of said longitudinal tube including a segment of said longitudinal tube outside of said vaporizer chamber.

15. A method as claimed in 12 wherein said vaporizer chamber, said injector tubing, and said carrier gas flow have a common longitudinal axis.

16. A method as claimed in claim 1 wherein the step of providing a constant flow of a liquid feedstock further comprises mixing a liquid siloxane with at least one dopant precursor liquid to form said liquid feedstock.

17. A method as claimed in claim 1 wherein the step of flowing a carrier gas into said vaporizer chamber, by said injector orifice, and through said mixture of liquid feedstock and injector gas expelled from said injector orifice further comprises flowing an inert carrier gas at a volume flow rate in the range from 0.1 to 0.3 standard liters per minute.

18. A method as claimed in claim 1 wherein said liquid feedstock is comprised of a mixture of at least two liquid compounds and further comprising the step of heating said vaporizer chamber to a temperature at least as high as the boiling point of the liquid compounds.

* * * * *